Patented Nov. 13, 1928.

1,691,077

UNITED STATES PATENT OFFICE.

RICHARD HENRY MORRIS, 3D, OF PHILADELPHIA, PENNSYLVANIA.

SPENT-SOIL COMPOST.

No Drawing.　　Application filed August 20, 1925.　Serial No. 51,332.

My invention relates to material particularly adapted for use as a top dressing on the sod of a golf course. However, it may be advantageously employed for the promotion of other plant growth.

In my copending application (117-25), Serial No. 51,331 filed August 20, 1925, I describe and claim an improvement in plant soil especially adapted for mushroom beds. Such soil includes approximately twenty percent of alkaline peat, primarily brown in color, and eighty percent of a mixture of straw and horse manure. When used as a mushroom bed; such soil is primarily raised to a temperature of 130° F., and then lowered to a temperature of 60° F., and kept moist at the latter temperature for about six months while mushrooms are grown therein. At first, such soil is promotive of mushroom growth, to a remarkable degree; but its qualities, in that respect, are so far exhausted and it becomes so far changed in character by the elements added to it and taken from it by the mushrooms; that at the expiration of six months, it is no longer economical to continue the cultivation of mushrooms therein. However, I have discovered that such soil, spent as far as cultivation of mushrooms is concerned, has a remarkable stimulating effect upon the growth of grass and other plants, particularly when used as a top dressing for the same.

Although such peat is known to contain stores of carbon and nitrogen; they are so embodied in the natural peat structure that they can only be rendered available by breaking down that structure into a more humified state. Such breaking down is partly effected by the action of the aerobic micro-organisms presented which is occasioned by the heat attending the fermentation of the mass in the initial step of its preparation aforesaid; such organisms being supplied with food from the manure. Moreover, such peat is about four times as efficient as ordinary loam dirt in its retention of moisture during decomposition of the compost, and thus prevents the latter from the "burning", which is usual with dirt composts; by keeping the compost supplied with a larger amount of moisture and inert organic material. Furthermore, the ammonia generated during the decomposition of the compost is retained by the peat to a greater degree than by ordinary loam dirt and attacks the naturally unavailable elements of the peat aforesaid; reducing them to forms more readily assimilated by the higher plants.

Mushroom plants not only have remarkable ability to attack and liberate the otherwise unavailable forms of carbonaceous and nitrogenous elements in the compost; but permeate the entire mass of the peat bed with their mycelium which aids materially in the improvement of the mass as bacterial food and fertilizer of higher plants.

However, the fibrous nature of said spent soil, incident to the inclusion of straw and peat therein, which is advantageous in the use thereof in a mushroom bed; interferes with the distribution of such soil as a top dressing. Therefore, to prepare such spent soil for use as a top dressing, I prefer to shred it so as to break up the long fibers residue of the peat and straw, and such shredding operation, of course, thoroughly remixes the ingredients of the soil so as to render the latter substantially uniform.

As set forth at length in my copending application aforesaid the peat ingredient thereof may be naturally alkaline and may be mixed with an additional alkaline material, for instance a calcium derivative, prevents any toxic accumulation of waste products in the mass, and further includes a material toxic with respect to plant disease germs; for instance, bichloride of mercury or a phenol derivative. Consequently, the residues of such alkaline and toxic material may be present in the spent soil aforesaid, in a more or less active state.

I do not desire to limit myself to the precise details of procedure herein set forth, as it is obvious that various modifications may be made therein without departing from the essential features of my invention as defined in the appended claims.

I claim:

1. The method of forming a compost, which consists in maintaining a bed of soil containing twenty percent fibrous peat mixed with eighty percent straw and horse manure, at a temperature of approximately 60° F., and moist for longer than three months, while cultivating mushrooms therein; said peat being primarily alkaline and inoculated with a substance toxic to mushroom disease germs; then shredding the mixture aforesaid to break up the fibrous portions thereof and mixing the same substantially uniformly throughout the mass.

2. The method of forming a compost which consists in maintaining a bed of soil containing fibrous peat mixed with straw and horse manure, at a temperature of approximately 60° F., and moist for longer than three months, while cultivating mushrooms therein; said peat being primarily alkaline and inoculated with a substance toxic to mushroom disease germs; then shredding the mixture aforesaid to break up the fibrous portions thereof and mix the same substantially uniformly throughout the mass.

3. The method of forming a compost, which consists in maintaining a bed of soil containing fibrous peat mixed with straw and horse manure, at a temperature of approximately 60° F., and moist for longer than three months, while cultivating mushrooms therein; then shredding the mixture aforesaid to break up the fibrous portions thereof and mixing the same substantially uniformly throughout the mass.

4. A compost including the residue of a mixture of fibrous peat and straw and manure primarily inoculated with a substance toxic to plant disease germs, and subjected to the growth of mushrooms therein; the fibrous portions thereof being shredded and mixed with the other portions thereof.

5. A compost including the residue of a mixture of fibrous peat and straw and manure primarily inoculated with a substance toxic to plant disease germs, and subjected to the growth of mushrooms therein; said peat being primarily alkaline, and the fibrous portions thereof being shredded and mixed with the other portions thereof.

6. A compost including the residue of a mixture of fibrous peat and straw and manure primarily inoculated with a substance toxic to plant disease germs, and subjected to the growth of mushrooms therein; said peat being primarily alkaline.

7. A compost including the residue of a mixture of fibrous peat and straw and manure which has been subjected to the growth of mushrooms therein; said peat being primarily alkaline, and the fibrous portions thereof being shredded and mixed with the other portions thereof.

8. A compost including the residue of a mixture of fibrous peat and straw and manure which has been subjected to the growth of mushrooms therein; said peat being alkaline.

In testimony whereof, I have hereunto signed my name at Philadelphia, Pennsylvania, this eleventh day of August, 1925.

RICHARD HENRY MORRIS, III.

CERTIFICATE OF CORRECTION.

Patent No. 1,691,077.   Granted November 13, 1928, to

RICHARD HENRY MORRIS 3D.

It is hereby certified that error appears in the printed specification of the above numbered patent requiring correction as follows: Page 2, line 56, claim 8, after the word "being" insert the word "primarily"; and that the said Letters Patent should be read with this correction therein that the same may conform to the record of the case in the Patent Office.

Signed and sealed this 15th day of January, A. D. 1929.

M. J. Moore,
Acting Commissioner of Patents.

(Seal)

mixing the same substantially uniformly throughout the mass.

2. The method of forming a compost which consists in maintaining a bed of soil containing fibrous peat mixed with straw and horse manure, at a temperature of approximately 60° F., and moist for longer than three months, while cultivating mushrooms therein; said peat being primarily alkaline and inoculated with a substance toxic to mushroom disease germs; then shredding the mixture aforesaid to break up the fibrous portions thereof and mix the same substantially uniformly throughout the mass.

3. The method of forming a compost, which consists in maintaining a bed of soil containing fibrous peat mixed with straw and horse manure, at a temperature of approximately 60° F., and moist for longer than three months, while cultivating mushrooms therein; then shredding the mixture aforesaid to break up the fibrous portions thereof and mixing the same substantially uniformly throughout the mass.

4. A compost including the residue of a mixture of fibrous peat and straw and manure primarily inoculated with a substance toxic to plant disease germs, and subjected to the growth of mushrooms therein; the fibrous portions thereof being shredded and mixed with the other portions thereof.

5. A compost including the residue of a mixture of fibrous peat and straw and manure primarily inoculated with a substance toxic to plant disease germs, and subjected to the growth of mushrooms therein; said peat being primarily alkaline, and the fibrous portions thereof being shredded and mixed with the other portions thereof.

6. A compost including the residue of a mixture of fibrous peat and straw and manure primarily inoculated with a substance toxic to plant disease germs, and subjected to the growth of mushrooms therein; said peat being primarily alkaline.

7. A compost including the residue of a mixture of fibrous peat and straw and manure which has been subjected to the growth of mushrooms therein; said peat being primarily alkaline, and the fibrous portions thereof being shredded and mixed with the other portions thereof.

8. A compost including the residue of a mixture of fibrous peat and straw and manure which has been subjected to the growth of mushrooms therein; said peat being alkaline.

In testimony whereof, I have hereunto signed my name at Philadelphia, Pennsylvania, this eleventh day of August, 1925.

RICHARD HENRY MORRIS, III.

CERTIFICATE OF CORRECTION.

Patent No. 1,691,077.            Granted November 13, 1928, to

RICHARD HENRY MORRIS 3D.

It is hereby certified that error appears in the printed specification of the above numbered patent requiring correction as follows: Page 2, line 56, claim 8, after the word "being" insert the word "primarily"; and that the said Letters Patent should be read with this correction therein that the same may conform to the record of the case in the Patent Office.

Signed and sealed this 15th day of January, A. D. 1929.

(Seal)

M. J. Moore,
Acting Commissioner of Patents.